United States Patent [19]

Sugimoto et al.

[11] Patent Number: 5,604,337
[45] Date of Patent: Feb. 18, 1997

[54] LOUDSPEAKER ARRANGEMENT IN TELEVISION RECEIVER CABINET

[75] Inventors: Masashi Sugimoto, Suita; Syuji Isono, Toyono-gun; Kazuo Yoshida, Takatsuki; Kiyoshi Sakai, Osaka; Yoshiaki Okihara, Ibaraki; Katsunori Yahiro, Takatsuki, all of Japan

[73] Assignee: Matsushita Electric Industrial Co., Ltd., Kadoma, Japan

[21] Appl. No.: 386,333

[22] Filed: Feb. 10, 1995

Related U.S. Application Data

[63] Continuation of Ser. No. 79,836, Jun. 22, 1993, abandoned, which is a continuation of Ser. No. 714,904, Jun. 17, 1991, abandoned.

[30] Foreign Application Priority Data

| Jun. 21, 1990 | [JP] | Japan | 2-163341 |
| Jul. 6, 1990 | [JP] | Japan | 2-180053 |
| Sep. 10, 1990 | [JP] | Japan | 2-240847 |

[51] Int. Cl.⁶ .................................................. H04N 5/64
[52] U.S. Cl. ............................ 181/152; 381/156; 348/818
[58] Field of Search ............................... 181/145–147, 181/150–152, 154–156, 159, 179, 189, 192, 198, 199; 381/156, 205; 312/7.2; 348/738, 818

[56] References Cited

U.S. PATENT DOCUMENTS

| 2,388,761 | 11/1945 | Patterson | 312/7.2 |
| 3,086,078 | 4/1963 | Sharma | 312/7.2 |
| 3,557,324 | 1/1971 | Nakamatsu | 181/155 |
| 3,571,509 | 3/1971 | Cross et al. | 312/7.2 X |
| 4,831,449 | 5/1989 | Kimura | 358/198 |
| 4,893,695 | 1/1990 | Tamura et al. | |
| 4,926,487 | 5/1990 | Yoshida et al. | 381/186 |
| 5,036,946 | 8/1991 | Yoshino | 181/156 |

FOREIGN PATENT DOCUMENTS

| 280162 | 8/1988 | European Pat. Off. . |
| 303912 | 2/1989 | European Pat. Off. . |
| 59-169172 | 11/1984 | Japan . |
| 1152899 | 6/1989 | Japan . |
| WO8911198 | 11/1989 | WIPO . |

OTHER PUBLICATIONS

English Abstract of JP 1–152899, published Jun. 1989.

*Primary Examiner*—Howard B. Blankenship
*Attorney, Agent, or Firm*—Cushman, Darby & Cushman IP Group of Pillsbury Madison & Sutro LLP

[57] ABSTRACT

A television receiver cabinet is provided including a plurality of wall members and at least one speaker horn sub-assembly, wherein at least one speaker unit is contained to form a horn structure. The loudspeaker horn sub-assembly utilizes at least part of the wall members, in its original place, as a component for structuring the sub-assembly.

8 Claims, 17 Drawing Sheets

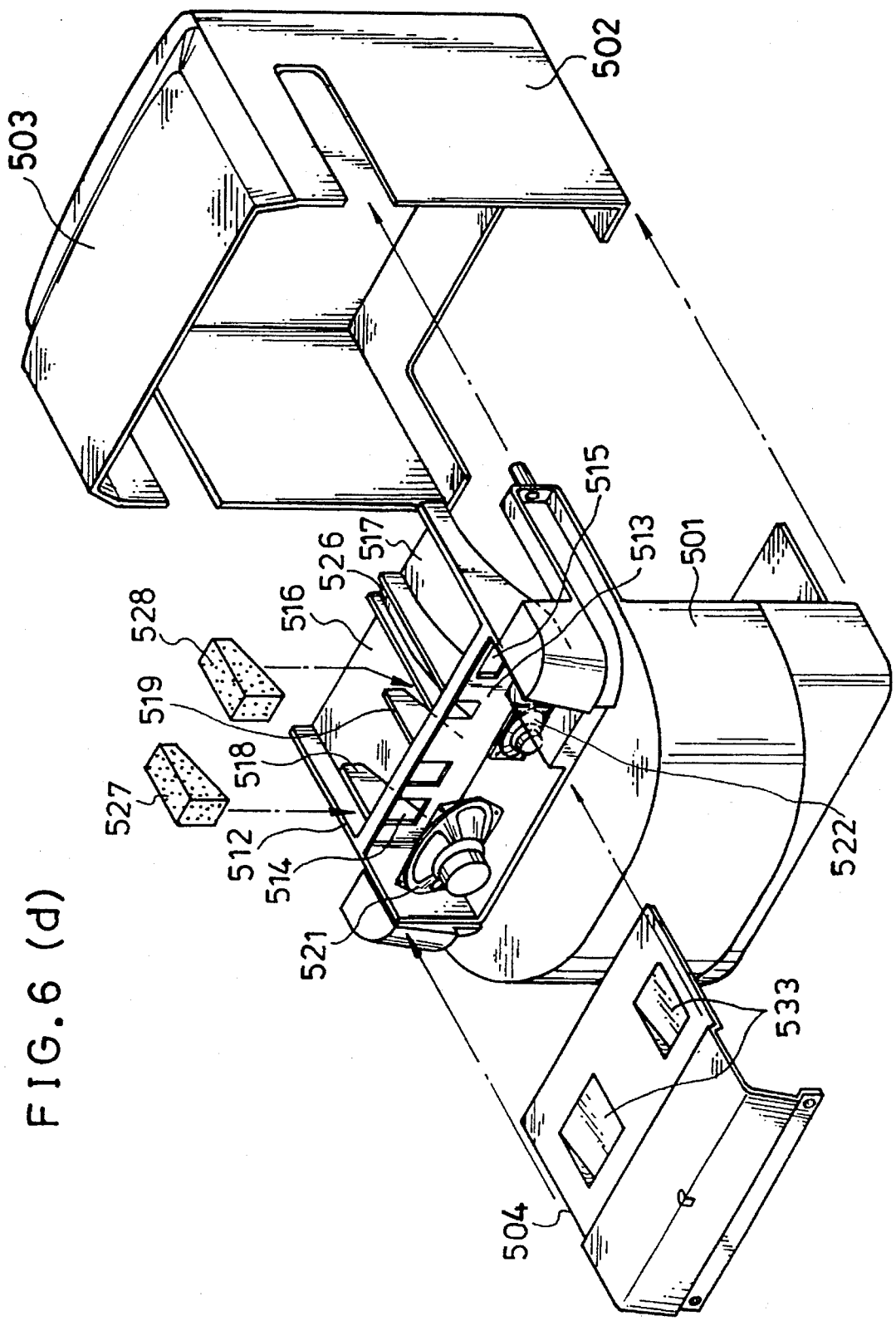

5,604,337

LOUDSPEAKER ARRANGEMENT IN TELEVISION RECEIVER CABINET

This is a continuation of application Ser. No. 08/079,836, filed Jun. 22, 1993, now abandoned, which was a continuation of application Ser. No. 07/714,904, filed on Jun. 17, 1991, now abandoned.

FIELD OF THE INVENTION AND RELATED ART STATEMENT

1. Field of the Invention

The present invention relates to a loudspeaker arrangement in a television receiver cabinet, and in particular, it is concerned with a horn sub-assembly simple in structure but excellent in sound performance. In another aspect of the present invention, it is particularly concerned with a loudspeaker arrangement in a television receiver cabinet of a space-effective type.

2. Description of the Prior Art

In recent years, a loudspeaker arrangement of a horn structure are remarked as one candidate for realizing excellent sound performance in the television receiver. On the other hand, the necessity for designing the television receiver of excellent sound performance more space-effective has been increasingly appreciated.

The conventional loudspeaker horn of this type for the television receiver has been realized, for instance, by forming a speaker horn sub-assembly 2 as shown in FIG. 10, independently from the cabinet 1 of the television receiver and then by installing it in the cabinet.

As shown in the drawing, the conventional speaker horn sub-assembly is structured by forming a front horn so that it may project from a front face side of a baffle board for supporting the speaker unit and by forming a rear horn so that it may project from a rear face side of the baffle board. The front horn should be configurated to have a narrowed cross-section region at its front half and a small width sound outlet at its front end lest it should collide with a cathode ray tube.

The stated structure of the horn sub-assembly is however disadvantageous in that the cabinet of the television receiver must be provided with a supporting means (omitted from the illustration) for the sub-assembly, and that an additional space must be provided in the cabinet to be occupied by the supporting means rather than by the horn sub-assembly itself.

Another disadvantage inherent to the conventional structure is a stringent spatial limitation imposed on the interior space of the television receiver cabinet which must contain a cathode ray tube, and an additional problem is another limitation imposed on the configuration of the horn sub-assembly for making it in conformity with that of the cabinet and thus the expected sound performance is not satisfactory.

OBJECTS AND SUMMARY OF THE INVENTION

It is therefore the primary object of the present invention to provide a loudspeaker arrangement in a television receiver cabinet which has overcome the above-mentioned disadvantages and solved the problems inherent to the conventional arrangements.

According to the present invention there is provided in a television receiver cabinet comprising a plurality of wall members and at least one speaker horn sub-assembly, which contains at least one speaker unit forming a horn structure a loudspeaker arrangement characterized in that: at least a part of said wall members in its original place form component of said speaker horn sub-assembly.

In the above-mentioned arrangement, said television receiver cabinet may preferably be two piece structure of a front and a rear cabinets.

In the two piece structure, said rear cabinet may have, on both the side wall members thereof, a pair of dents. Each of said dents is composed of a U-cross-section channel and a baffle board disposed in a plane of the front face of said rear cabinet with an opening for installing said speaker unit thereto. The rear end of said dent is open but is covered with a separate lid, thereby resultantly to form a rear horn of said horn assembly.

Each of said U-cross-section channel may further elongate forwards beyond the front face of said rear cabinet to form a front horn with a part of the side wall member of said front cabinet when combined with said front cabinet.

Alternatively, each of the front horns of said speaker horn sub-assemblies may be formed integrally with a part of the side wall member of said front cabinet. Similarly each of the rear horns of said speaker horn sub-assemblies may be formed integrally with a part of the side wall member of said rear cabinet. And each of baffle boards with an opening for receiving the speaker unit is preferably be interposed between said front horn and said rear horn.

In a preferred mode of the present invention, each of the speaker horn sub-assemblies may include a front horn, which is projected forwards from a baffle board for supporting a speaker unit and has a narrowed cross-section region.

Each of the mid-point between side members of said front horns at said narrowed cross-section region may preferably in a plane which includes each of the center lines of the speaker units, and each of said front horn may preferably be formed. Both side members at regions between said baffle board and said narrowed cross-section regions are preferably and substantially symmetrical with respect to a plane which contains the center lines of said speaker units and is perpendicular to the planes of the baffle boards.

In another mode of the present invention, each of the baffle boards for supporting said speaker units, formed integrally with parts of said side wall members, may preferably be provided on each of the side members of said cabinet in planes independent from said cabinet. Each of said speaker horn sub-assemblies may be constituted by including, as their essential components, each of the parts of the side members of said cabinet in its original place. Each of said baffle boards may preferably be positioned at an angle greater than 0° and smaller than 45° with respect to the front face of said television receiver.

In still another mode of the present invention, each of said horn sub-assemblies may also be comprised of a baffle board with an opening for supporting a speaker unit, a front horn and a rear horn. Side of the horn which faces said side wall member of said cabinet is cut open; and preferably, the baffle board, top member, bottom member and a side member opposite to said side may be integrally formed, and each of said horn sub-assemblies may be fixed on said side wall member of said television cabinet so that its open cut side face may closely contact with said side wall member.

In a further mode of the present invention, each of said speaker horn sub-assemblies may be formed by combining a side member opposite to the side facing the side wall member of said cabinet, a baffle board with an opening for supporting a speaker unit, a top member and a bottom member, and a part of the side wall member of said television receiver cabinet in an integral body. It is preferable that distances between the baffle board and a sound outlet of said horn sub-assembly, both along said part of the wall member of the cabinet and along said side member of the horn sub-assembly opposite to the side facing to the side member of said cabinet, may be substantially equal.

In another mode of the present invention, each of said speaker horn sub-assemblies may comprise a front horn, a rear horn and a baffle board with an opening for supporting a speaker unit, and an open cut face in the same direction as that of said front horns may also be preferably provided on each of said rear horns.

Alternatively, said open cut face provided on said rear horn may preferably be in a plane substantially equal to that of the open cut face of said front horn, and above and below said open cut face of said front horn.

Each of the areas of the open cut faces provided on said rear horns may preferably be substantially equal to each of the areas of the open cut faces of said front horns.

Furthermore, each of the areas of the upper and lower open cut faces of said front horns may preferably be substantially equal to each of the areas of the open cut faces provided on the upper and lower parts of said rear horns.

In another mode of the present invention, each of said speaker horn sub-assemblies may comprise a front horn, a rear horn and a baffle board with an opening for supporting a speaker unit. Each of the areas of the front open outlets of said front horns may preferably be substantially equal to each of the areas of parts of said baffle boards actually utilized for supporting the speaker unit.

In each of the above-mentioned modes of the present invention, the loudspeaker arrangement may further comprise at least one sound reflector in or on each of said speaker horn sub-assemblies.

The sound reflector may preferably be formed on the front horn of each of said speaker horn sub-assemblies, and may be either one of a dent or a protrusion provided on each of the lids covering open cut faces or side wall members of said receiver cabinet as an integral component of said horn sub-assemblies. Or alternatively, the sound reflector may be attached inside the side wall member of said receiver cabinet which corresponds to said front horn.

In each of the above-mentioned modes of the present invention, the loudspeaker arrangement may further comprise at least one bass-reflex port on each of said speaker horn sub-assemblies. Said bass-reflex port may preferably be provided on the rear horn of each of said speaker horn sub-assemblies, and may preferably be formed as an opening provided on each of the lids or side wall members of said receiver cabinet as an integral component of said speaker horn sub-assemblies.

In any of the above-mentioned modes of the present invention, both of the side faces of said speaker horn sub-assemblies may be cut open, and each of said cut open faces may preferably be covered with a lid having, at its front part, at least one cramp means for securing engagement with top plate member or bottom plate member of the front horn part of said speaker horn sub-assembly.

In another aspect of the present invention, there is provided a loudspeaker arrangement in a television receiver cabinet of a two piece structure composed of a front and a rear cabinet which comprises;

a baffle board with at least one opening for supporting at least one speaker unit in a plane substantially parallel to a plane of a front face of said rear cabinet;

a front horn, which is fixed on and projected forwards from said baffle board and is inserted into an upper part of said front cabinet; and a rear closed space mounted on top of said rear cabinet and defined by a plane of said baffle board.

On the above-mentioned baffle board, a pair of woofer speakers may preferably be laterally provided on said baffle side by side, and said front horn is partitioned into a pair of branch horns each of which corresponds to each of said woofers.

In one mode of the above-mentioned aspect of the present invention, only one woofer speaker may preferably be fixed on said baffle board, which further has a partitioned front horn part comprising a pair of branch horns, and one branch horn is used as a means with a bass-reflex port. Alternatively, one woofer speaker and one tweeter speaker, and a partitioned front horn part which has three branch horns may be provided on said baffle board, wherein one branch horn is used as a means with a bass-reflex port, to use them in a two-way sound system.

In another mode of the above-mentioned embodiment of the present invention, a woofer speaker and a partitioned front horn part having at least three branch horns may preferably be provided on the baffle board with said woofer at its center, and two tweeter speakers are provided on each of the branch horns of both sides.

In any of the above-mentioned mode, said rear closed space, if any, may preferably be sealed air-tightly.

As previously described, since the loudspeaker arrangement built in accordance with the present invention provides the speaker horn sub-assembly of the television receiver to be formed together with its cabinet by utilizing the top or side wall member of the cabinet in its original place, only little limitation is imposed on the space being occupied by the horn sub-assembly. Further, since a substantially equalized sound balance is obtained between the right and left loudspeakers, an improved sound performance is obtained.

By building the loudspeaker arrangement in accordance with the stated another aspect of the present invention, a space effective design of the television receiver cabinet with small width is made possible. In addition to this, a stereophonic sound system or a split band sound system can be realized by partitioning the front horn into a plurality of branch horns and by utilizing some of the branch horns for a means with a bass-reflex port.

While the novel features of the present invention are set fourth particularly in the appended claims, the invention, both as to organization and content, will be better understood and appreciated, along with other objects and features thereof, from the following detailed description taken in conjunction with the appended drawings.

BRIEF DESCRIPTION OF THE DRAWINGS

FIG. 6(d) is an exploded perspective view showing a mode of assembling the embodiment shown in FIG. 6(a).

It will be recognized that some or all of the Figures are schematic representations for purposes of illustration and do not necessarily depict the actual relative sizes or locations of the elements shown.

DESCRIPTION OF THE PREFERRED EMBODIMENT

In the following paragraphs, the present invention will be described in more detail, with reference to the preferred embodiments thereof shown in the attached drawings.

EXAMPLE 1

Figure 1A:
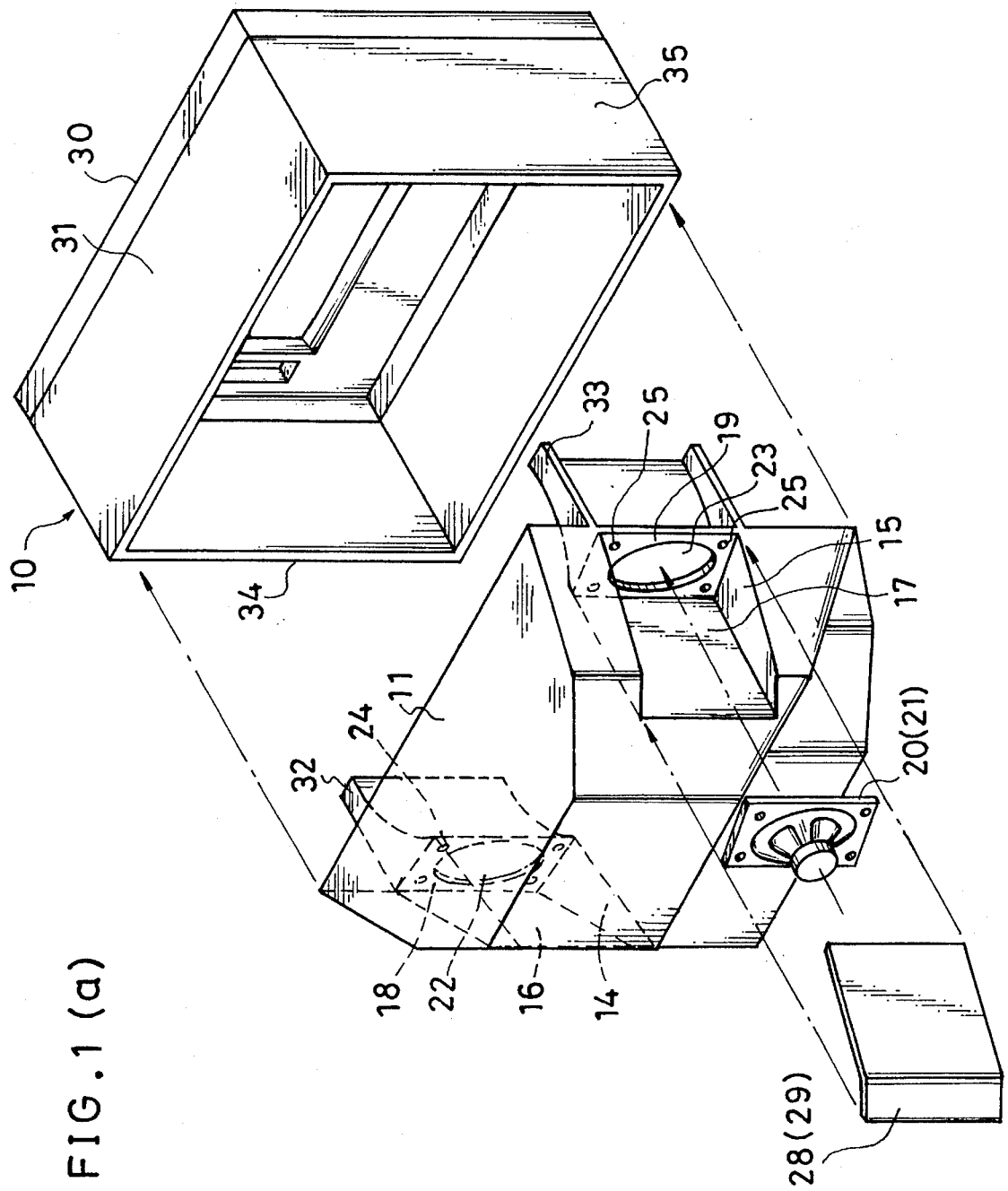
FIG. 1(a) is an exploded perspective view showing an embodiment of the loudspeaker arrangement built in accordance with the present invention viewed from the rear side.
Figure 1B:
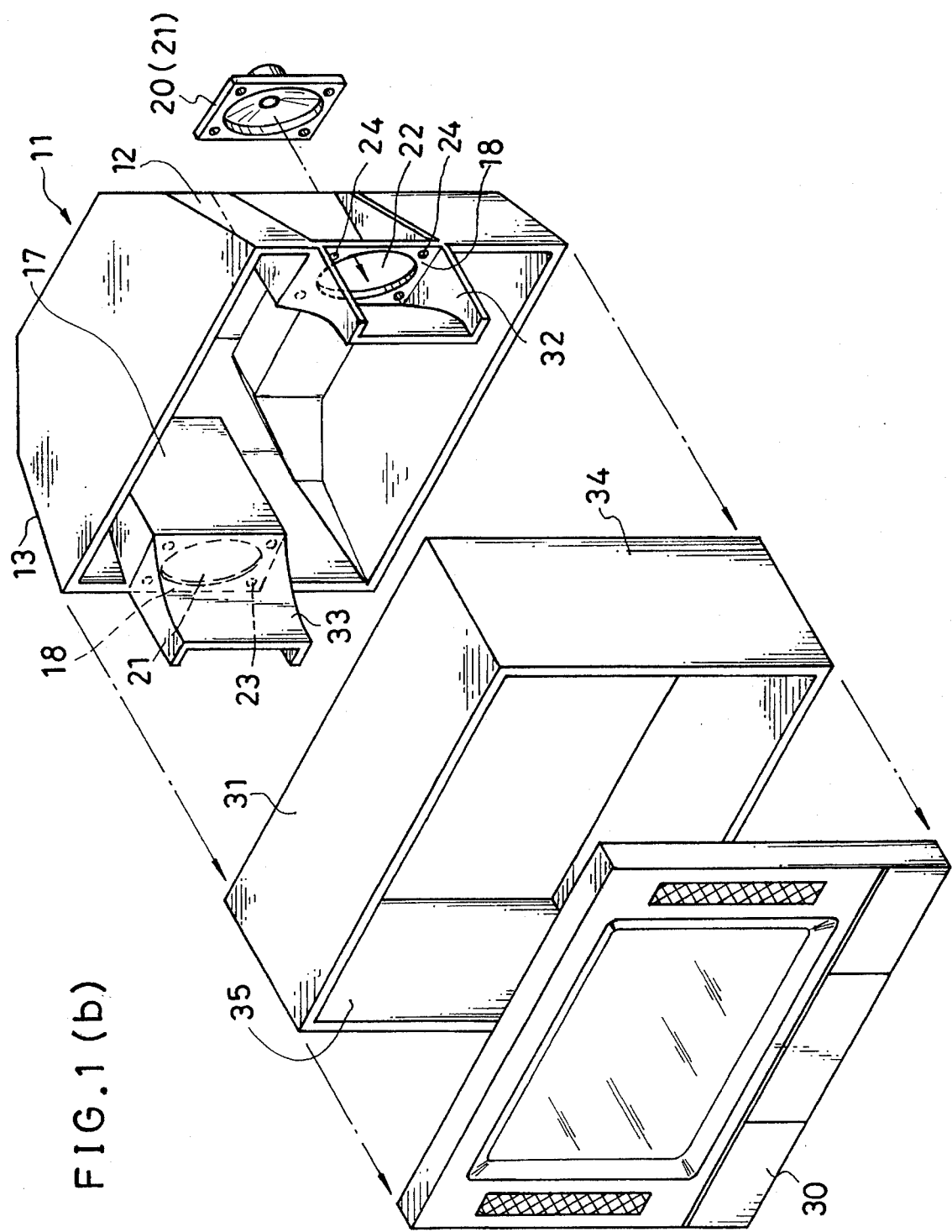
FIG. 1(b) is an exploded perspective view of the embodiment shown in FIG. 1(a) viewed from the front side.
Figure 1:
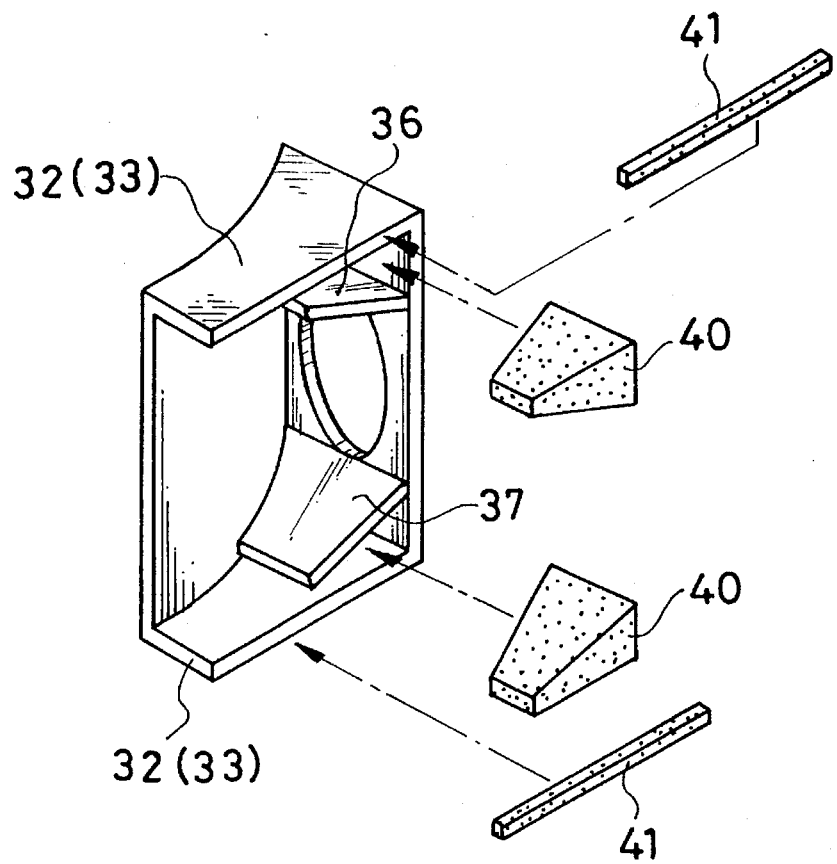
FIG. 1(c) is an exploded perspective view of the front horn with variations of the embodiment shown in FIG. 1(a).
FIG. 1(d) is a perspective view of a lid with a variation of the embodiment shown in FIG. 1(a).
Figure 1:
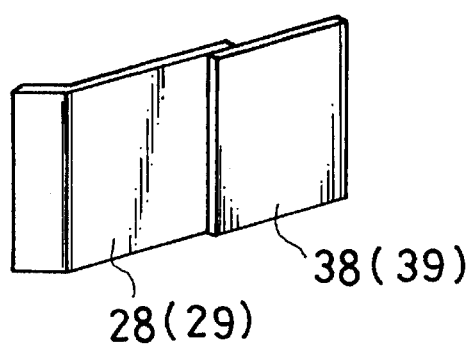

In FIG. 1, a television receiver cabinet 10 takes a two piece structure, which is composed of a rear cabinet 11 and a front cabinet 31. In both side wall members 12 and 13 of the rear cabinet 11, there are provided a pair of dents 14 and 15, formed by, for instance, depressing a sheet-like material of the wall members. Each of the dents 14 and 15 is composed of a U-cross-section channel 16 or 17 and a baffle board 18 or 19, which is disposed in a plane of the front face of the rear cabinet 11 and supports a speaker unit 20 or 21.

In each of the baffle boards 18 and 19, there are provided an opening 22 or 23 for the speaker units 20 or 21 and (threaded) holes 24 or 25 for fixing the speaker unit on the battle board 18 or 19. When the open rear ends of the dents 14 and 15 are covered with lids 28 and 29, each of the U-cross-section channels 16 and 17 forms rear horn of the speaker horn sub-assembly, respectively.

The U-cross-section channels 16 and 17 are extended forwards beyond the front face of the rear cabinet 11 up to an escutcheon 30, as elongated U-cross-section channels 32 and 33. The elongated channels 32 and 33 have their open-cut sides facing the side wall members 34 and 35 of the front cabinet 31, respectively, and when combined with the front cabinet 31, form front horns of the horn sub-assemblies.

In a modification of this embodiment shown in FIG. 1(c), an inner horn structure composed of a pair of wall member 36 and 37 is provided in each of the front horns. The lids 28 and 29 optionally have their forwardly elongated members 38 and 39, respectively as shown in FIG. 1(d) for covering the open-cut sides of the elongated channels 32 and 33. It is needless to say that any pieces 40 of suitable sound absorbing material may be provided on any appropriate places, for instance, in the interstices formed between the inner horn members 36 and 37, and top and bottom wall members 32 or 33. Further, any gasket 41 or elastic packing material made of, for example, polyurethane foam may be used in assembling the respective member into a combined body as shown in FIG. 1 (c).

EXAMPLE 2

Figure 2:
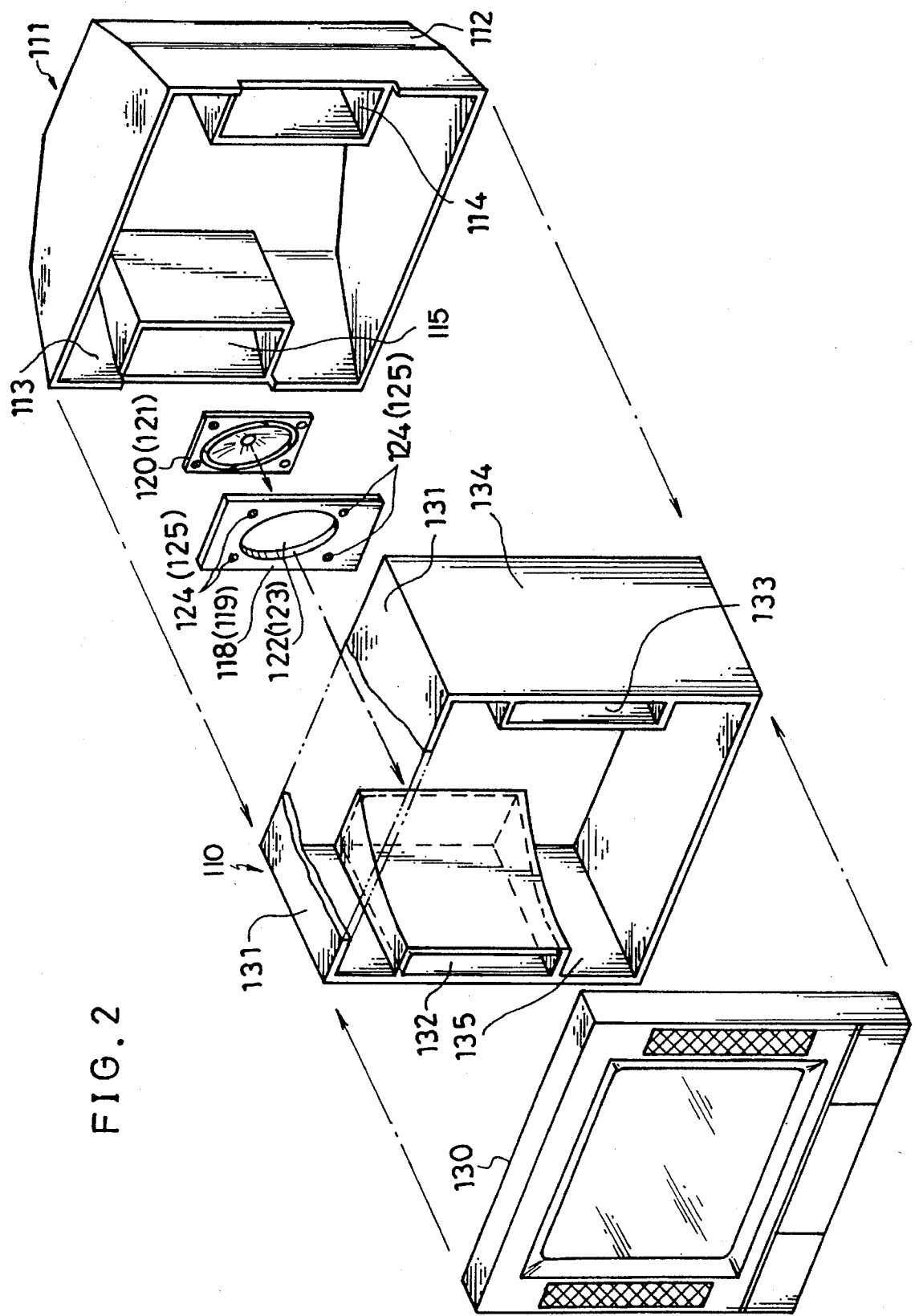
FIG. 2 is an exploded perspective view of another embodiment of the present invention, partly cut-out for illustration.

In FIG. 2, another mode of television receiver cabinet 110 also takes a two piece structure composed of a rear cabinet 111 and a front cabinet 131. In both sides of the rear cabinet 111, there are provided a pair of rear horns 114 and 115 of the speaker horn sub-assemblies composed of U-cross-section channels and parts of the side wall members 112 and 113 of the rear cabinet 111.

In both sides of the front cabinet 131, there are provided a pair of front horns 132 and 133 composed of channels and parts of the side wall members 134 and 135 whose U-cross-sections at the rear face of the front cabinet 131, i.e., the front face of the rear cabinet 111, are substantially equal to those of the channels 114 and 115, respectively. In front of the front cabinet 131, an escutcheon 130 is fixed.

Being interposed between the rear cabinet 111 and the front cabinet 131 and at positions which correspond to the U-cross-section channels, there are a pair of baffle boards (only the left side thereof 118 is illustrated). In the baffle board 118, there are provided an opening 122 for mounting the speaker unit 120 thereon and threaded holes 124 for securing the speaker unit on the boards.

EXAMPLE 3

Figure 3A:
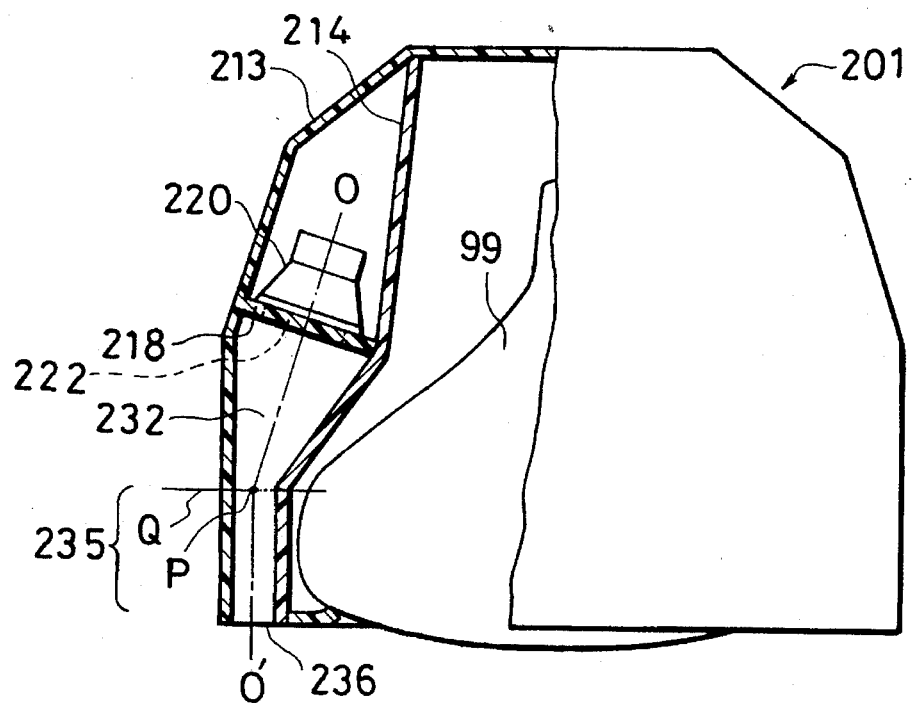
FIG. 3(a) is a plan view of an embodiment built in accordance with the present invention, partly cut-out for illustration.

Another cabinet 201 of the embodiment shown in a half cross-sectional plane view of FIG. 3(a) takes a one-piece structure of a polygon. Since this structure is also symmetrical with respect to a vertical plane which includes the center-line of the cathode ray tube CRT 99, only left side half thereof is cut out for illustration and will be described.

Figure 3B:
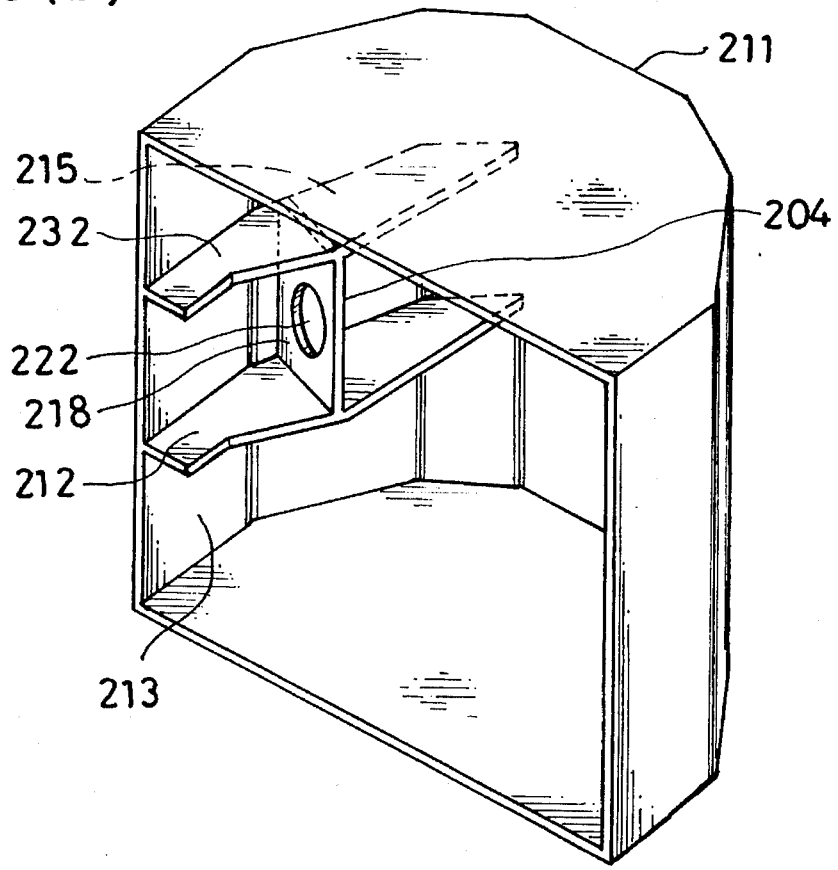
FIG. 3(b) is a perspective view of the embodiment shown in FIG. 3(a).

As more illustratively shown by the perspective view of FIG. 3(b), baffle boards 218 with an opening 222 for mounting a speaker unit 220 thereto is fixed to the side wall member 213 of the cabinet 211 along a plane which crosses the plane of the side wall member 213. Both of top and bottom members 211 and 212 are also fixed to the side wall member 213 of the cabinet 201 in parallel with the top and bottom wall member of the cabinet 201 to form a U-crosssection channel as a shelf hung on the inner side wall of the cabinet 201. The open-cut side of the channel is covered with a flexed plate member 214 to form a speaker horn sub-assembly having a rear horn 215 and a front horn 232, which has a narrowed cross-section region 235 towards the front end thereof, i.e., a sound outlet 236, lest it should collide with the CRT 99. As shown in FIG. 3(a), the speaker unit is mounted on the baffle board 218 so that the central axis of a cone of the speaker unit 220 passes a mid-point P between the side wall member 213 and the flexed plate member 214 at which the cross-section of the front horn 232 begins to narrow. Consequently, the sound emanated from the speaker unit and passed the mid-point P is directed perpendicularly and linearly to a listener in front of the television receiver.

In this structure, a mid point P between the side wall member 213 of the cabinet 201 and the flexed plate member 214, in a vertical plane Q at which the cross-section of the front horn 232 begins to narrow, is in a vertical plane which includes the center-line O-P of the speaker unit and the center line P - O' of region 235. Further, a distance between the plane of the baffle board 218 and the plane Q along the side wall member 213 is substantially equal to the distance between the plane of the baffle board 218 and the plane Q along the flexed plate member 214. In other words, a part of the front horn 232 between the baffle board 218 and the plane Q is substantially symmetrical with respect to the plane including the center line of the speaker unit 220.

EXAMPLE 4

Figure 4A:
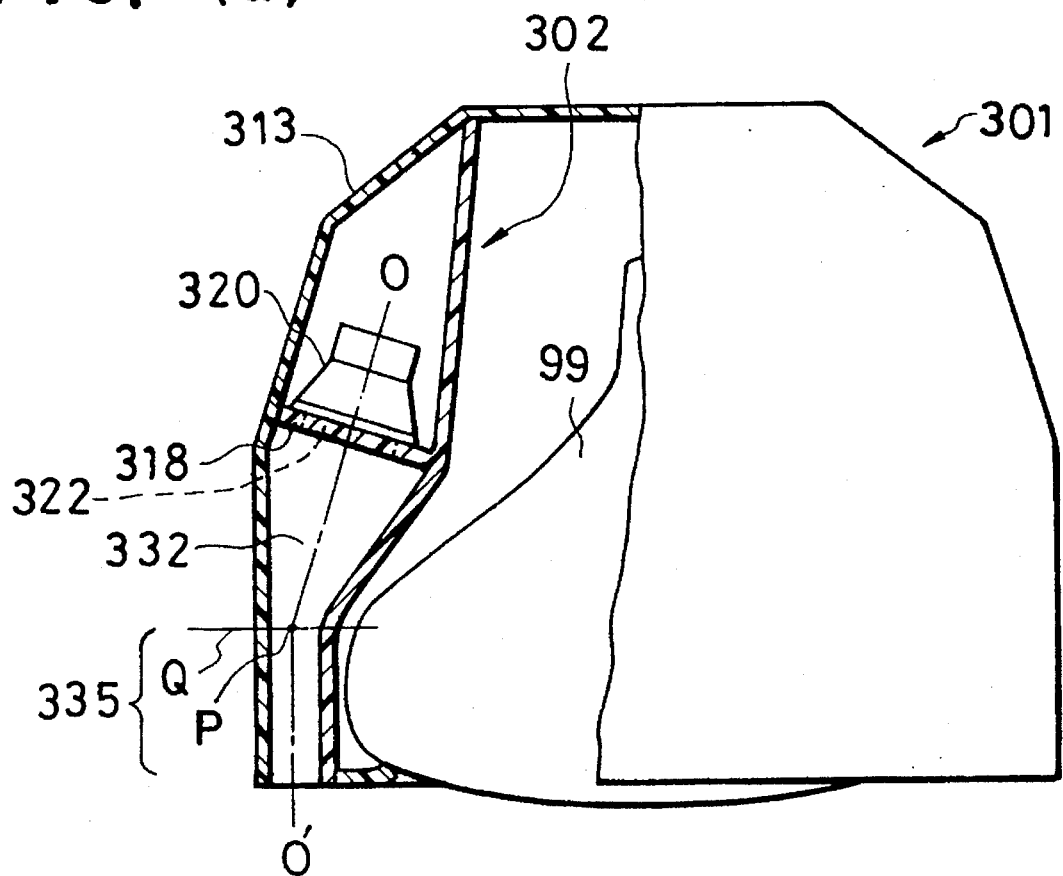
FIG. 4(a) is a plane view of another embodiment built in accordance with the present invention, partly cut-out for illustration.
Figure 4B:
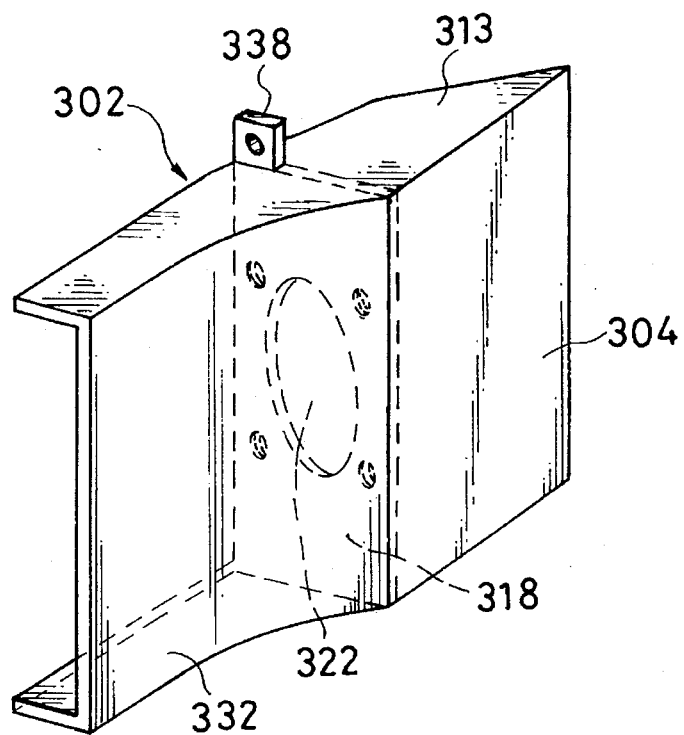
FIGS. 4(b) and 4(c) are perspective views of a half-finished horn sub-assembly as a component for the embodiment shown in FIG. 4(a).
Figure 4C:
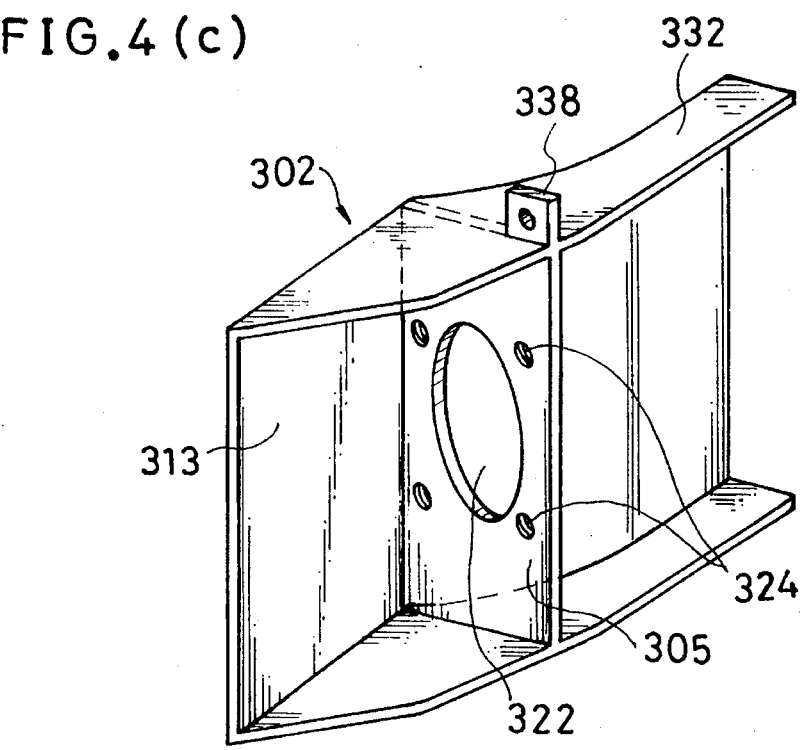

Another cabinet 301 of one piece structure is also symmetrical with respect to a vertical plane including the center line of the cathode ray tube CRT, and is shown in a partly cross-sectional plane view of FIG. 4(a). In FIG. 4(a) only a left side half-finished speaker horn sub-assembly and a left half of the CRT are shown in cross-section. FIG. 4(b) is a front perspective view and FIG. 4(c) is a rear perspective view of one of the half-finished speaker horn sub-assembly 302.

The sub-assembly 302 is half-finished beforehand by combining members for structuring a front horn 332, a rear horn 313, a baffle board 318 with an opening 322 and threaded holes 324 for supporting a speaker unit 320 and a fastening means 338. When assembled in a receiver cabinet 301 as shown in FIG. 4(a), the half-finished sub-assembly 302 serves to act as the speaker horn sub-assembly together with a part of the side wall member 313 of the cabinet 301. In this case however the rear horn 313 is closed air-tightly.

FIG. 4(a) also shows that a mid point P at the narrowed cross-section region 335 of the front horn 332, in a vertical plane Q, is in a vertical plane which includes the center-line O - O' of the speaker unit, and that distances between the plane of the baffle board 318 and the plane Q, both along the side members are substantially equal.

EXAMPLE 5

Figure 5A:
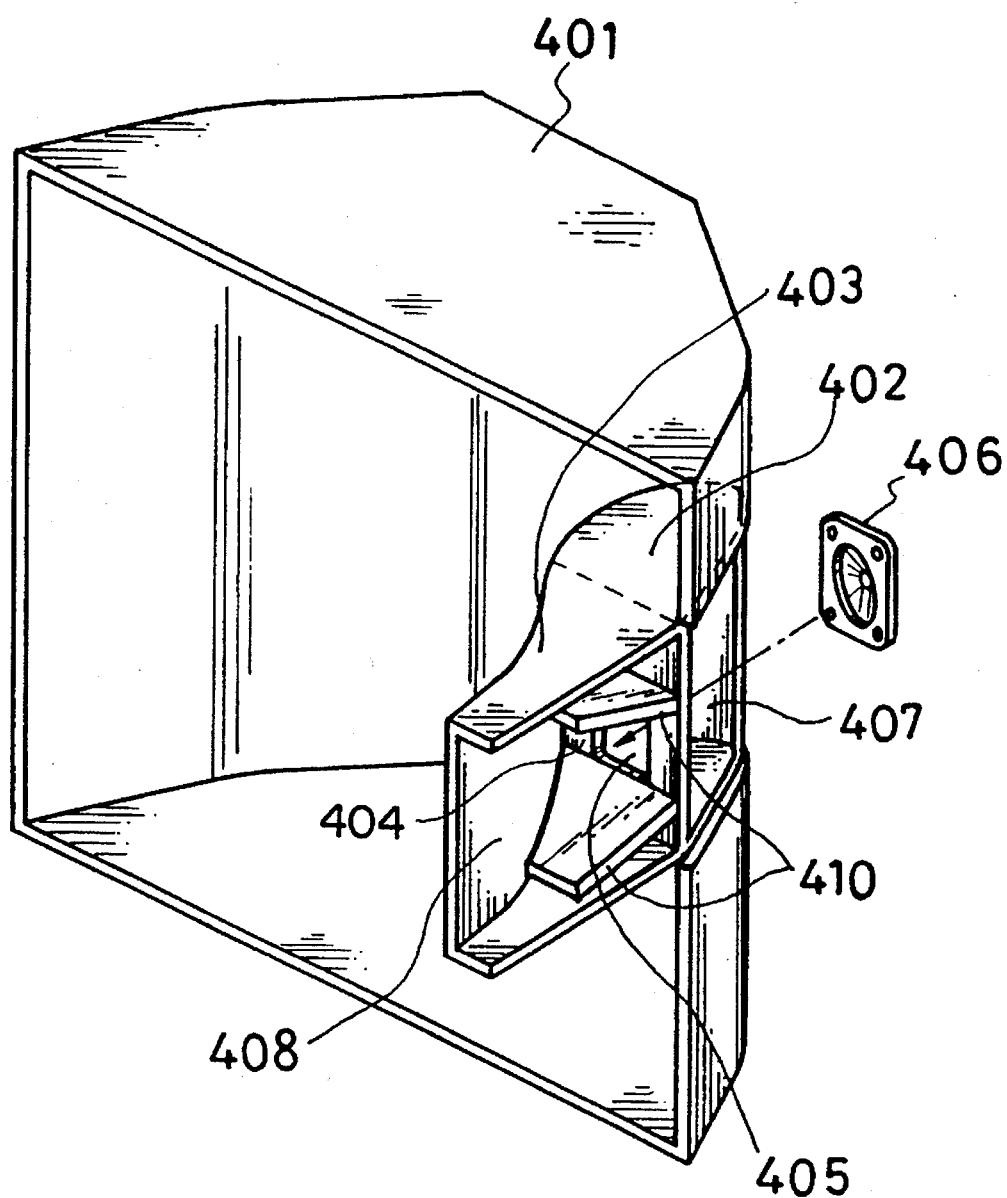
FIG. 5(a) is a perspective view of a further embodiment wherein only a rear cabinet and a right side horn sub-assembly are illustrated.
Figure 5:
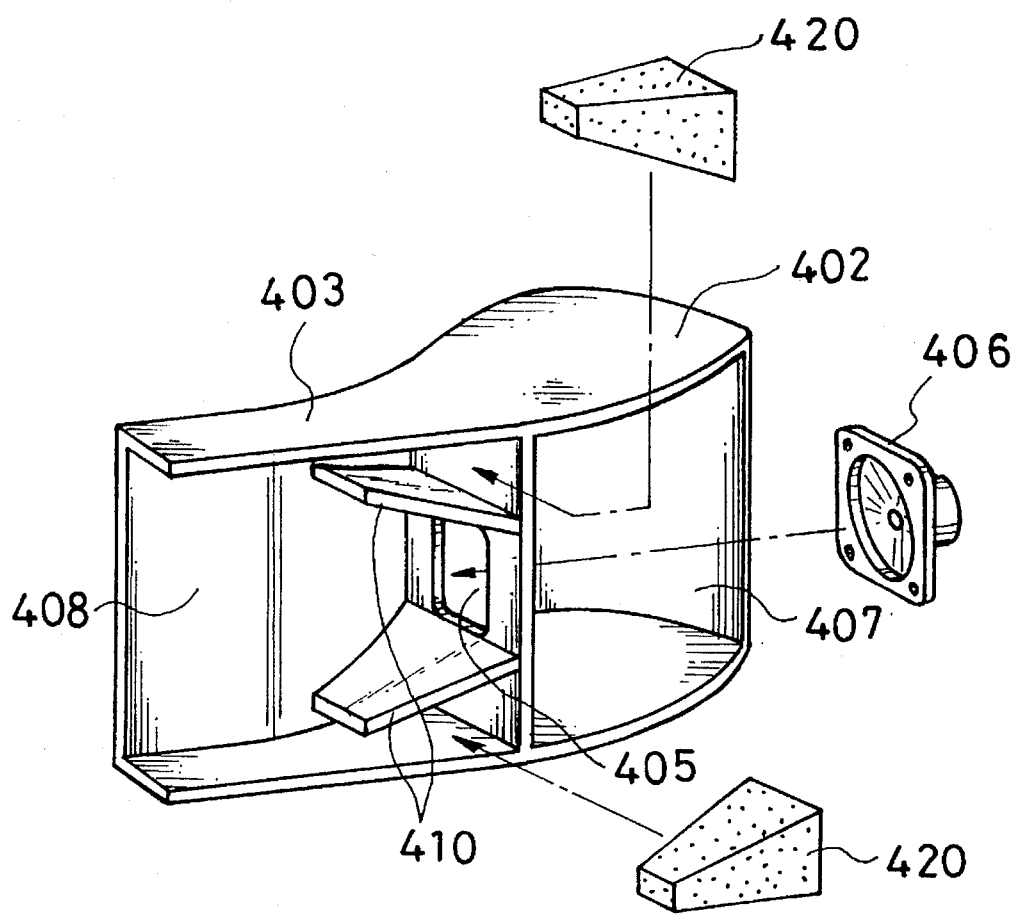
FIG. 5(b) is an exploded perspective view of a half-finished speaker horn sub-assembly of the embodiment shown in FIG. 5(a).
FIGS. 5(c) and 5(d), each is a cross-sectional view of a lid to be used as a component of the speaker horn sub-assembly shown in FIG. 5(b).
FIG. 5(e) is a perspective view for illustrating a mode of installing a lid with a variation into the half-finished horn sub-assembly shown in FIG. 5(b).
Figure 5:
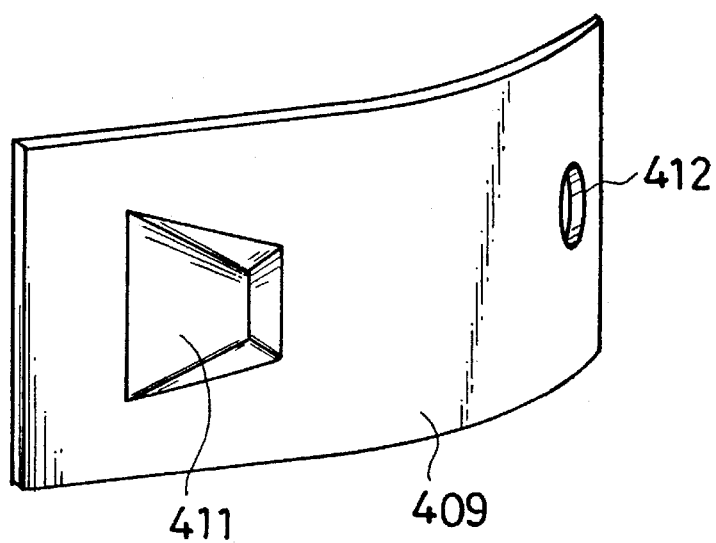

In an embodiment shown in FIG. 5 (a). the receiver cabinet takes a two-piece structure again, wherein only a rear cabinet 401 and a right side horn sub-assembly are illustrated. Two U-cross-section channels 402 and 403 are joined at a baffle board 404 with an opening 405 for mounting a speaker unit 406 thereon. The thus combined channels 402 and 403 as well as the baffle board 404 compose a half-unit of the speaker horn sub-assembly whose side face is cut open in both regions of a rear horn 407 and a front horn 408. The half-unit is finished to the horn sub-assembly when open-cut faces are covered with a lid 409. In this embodiment, a pair of inner horn members 410 are provided in the front horn 408 and a sound reflector 411 is provided on the lid 409. A pair of sound absorbers 420 made of elastic material are also provided behind the inner horn members 410. The sound reflector 411 is an inwardly protruded dent of the lid 409. If the front horn 408 is constituted with a part of the side wall member of the front cabinet as in the case of Example 1, the sound reflector 411 is provided in the interior of the front cabinet.

Figure 5C:
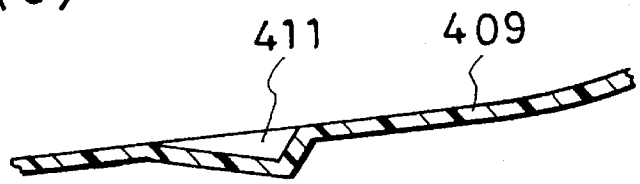
Figure 5D:
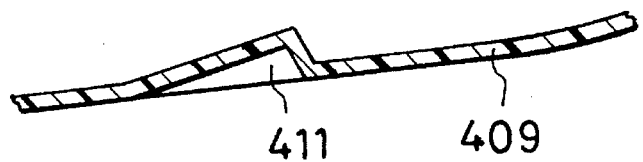

In a modification shown in FIG. 5(c) of this embodiment, the sound reflector 411 is provided on the lid 409 so that it may protrude outwardly from the plane of the lid 409 as opposed to the lid 409 shown in FIG. 5(d), wherein the sound reflector 411 is a dent. In addition to this, a bass-reflex port 412 is provided on the lid 409 in its region corresponding to the rear horn 407.

Figure 5E:
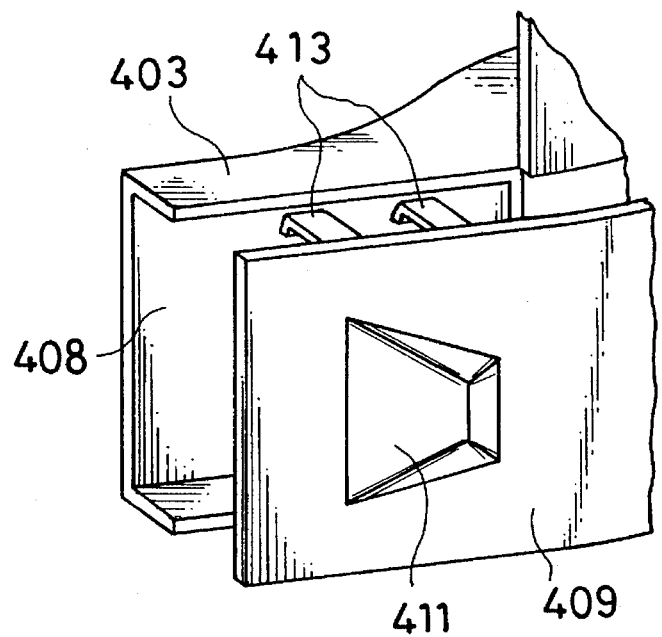

In FIG. 5(e), whereby a mode for installing the lid 409 into the speaker horn sub-assembly is illustrated, the lid 409 is further provided with clamp means 413, made of resilient material, for instance metal spring, for engaging the front horn 408 for easy assembling.

EXAMPLE 6

Figure 6A:
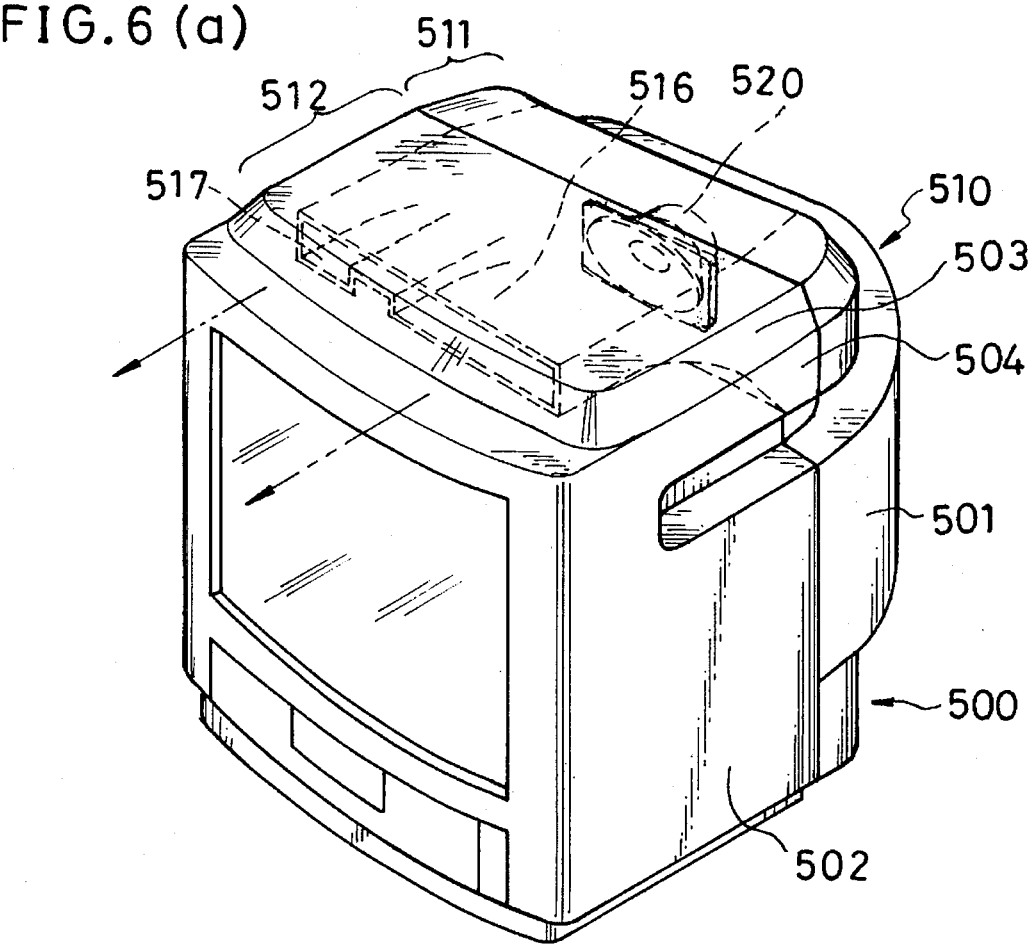
FIG. 6(a) is a perspective view of an embodiment built in accordance with the another aspect of the present invention.
Figure 6B:
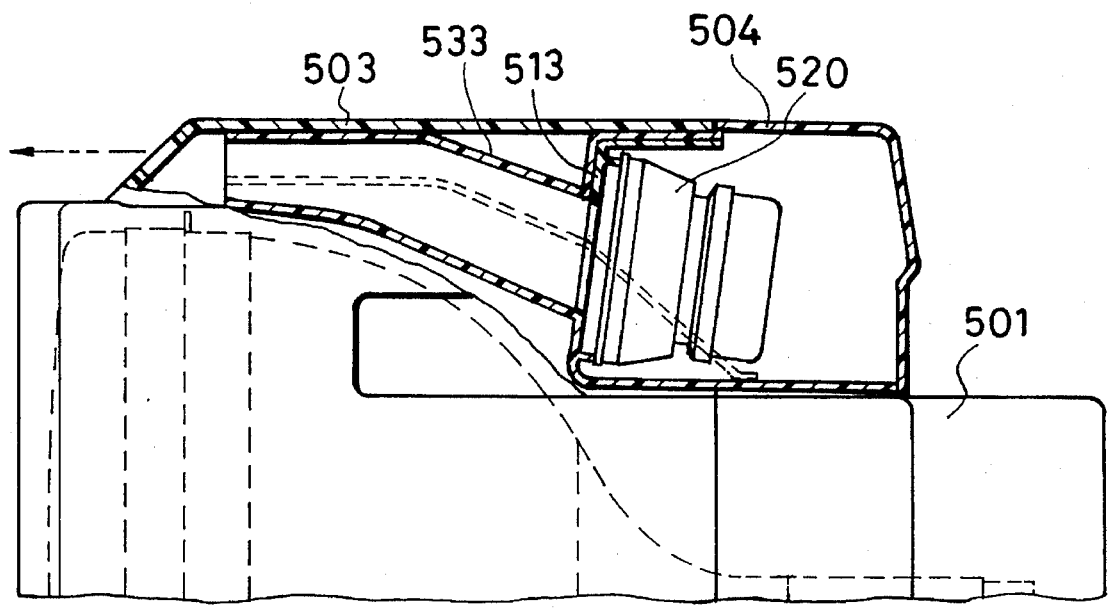
FIG. 6(b) is a cross-sectional view of the embodiment shown in FIG. 6(a).

A perspective view of FIG. 6(a) schematically shows a general concept of a series of embodiments built in accordance with the stated another aspect of the present invention. FIG. 6(b) is a side sectional view of the upper half of the television receiver 500 having the speaker sub-assembly 510 of this type. In both the figures.

FIG. 6(a) a television receiver 500 whose top is hypothetically depicted to be transparent. The speaker horn sub-assembly 510 takes a flexed two-piece structure composed of a rear closed space 511 and a front horn 512. The rear closed space 511 is mounted on a rear cabinet 501 of the television receiver 500, and the front horn 512 is inserted into a front cabinet 502 to be contained in a dome 503 ingtegrally formed on top of the front cabinet 502, when being assembled.

An upright plate member 513 mounted on the rear cabinet 501 in a plane, which divides the horn sub-assembly 510 into the rear horn 511 and the front horn 512, also serves as a baffle board with openings 514 for mounting a speaker 520 thereon and with another opening 515 used as a means with a bass reflex port. The front horn 512, fixed on the baffle board 513, is partitioned into a pair of branch horns 516 and 517, and the latter 517 is used as a means with a bass-reflex port. A pair of inner horn members 518 and 519 are also provided in the branch horn 516 as more illustratively shown by FIG. 6(c), wherein only the sub-assembly is viewed from the rear side and a mode of partitioning is differently depicted, and the opening 514 is split into two, while their functions are substantially the same.

Figure 6C:
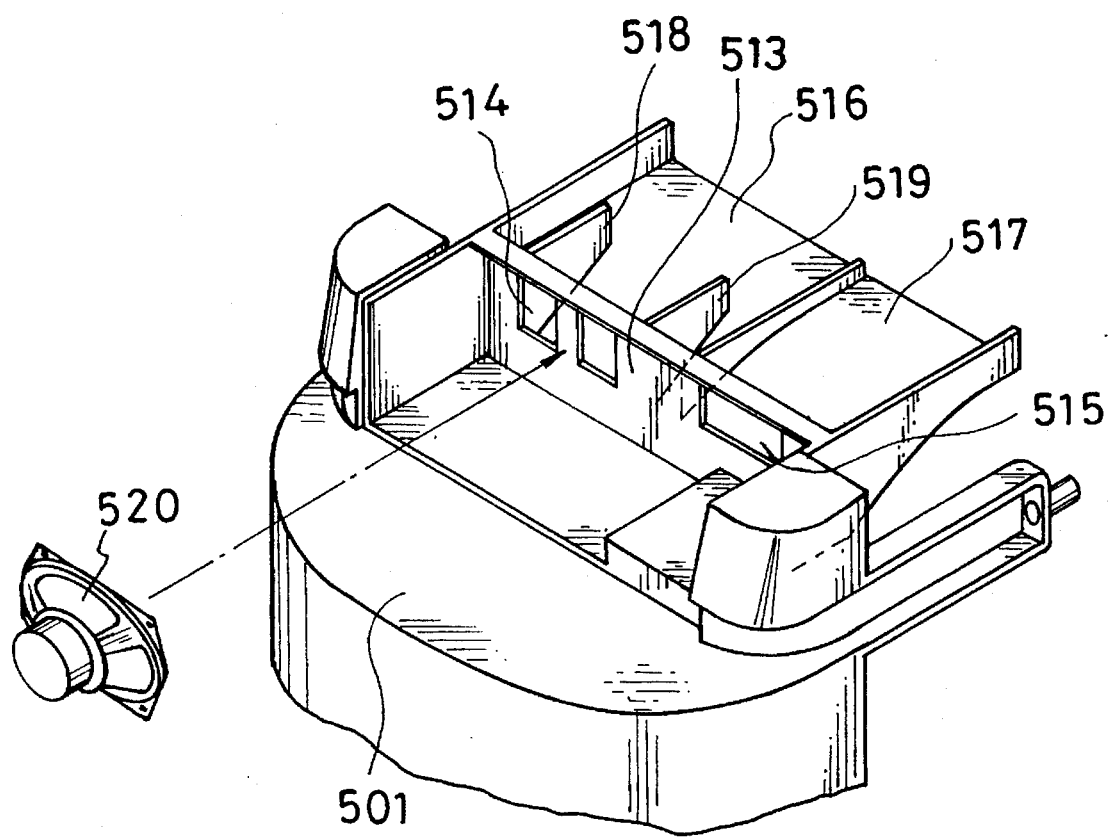
FIG. 6(c) is a perspective view of the speaker horn sub-assembly to be used with the embodiment shown in FIG. 6(a).

The mode of the assembling process is depicted in an exploded perspective view of FIG. 6(d) with a variation of the embodiment shown in FIGS. 6(a), 6(b) and 6(c). In this embodiment, a woofer speaker 521 and a tweeter speaker 522 are provided instead of a single speaker unit, and the front horn 512 is partitioned into three branch horns 516, 517 and 526, of which the center branch horn 526 serves as a means with bass-reflex port. In addition, a pair of inner horn members 518 and 519 as well as a pair of sound absorbing means 527 and 528 are also contained, in order to expand the reproducible frequency band in a two-way sound system. The upper face of the speaker horn sub-assembly 510 is covered with a lid 504 having a pair of sound reflectors 533 corresponding to the pair of the branch horns 516 and 517 and formed as dents on the lid 504.

EXAMPLE 7

Figure 7:
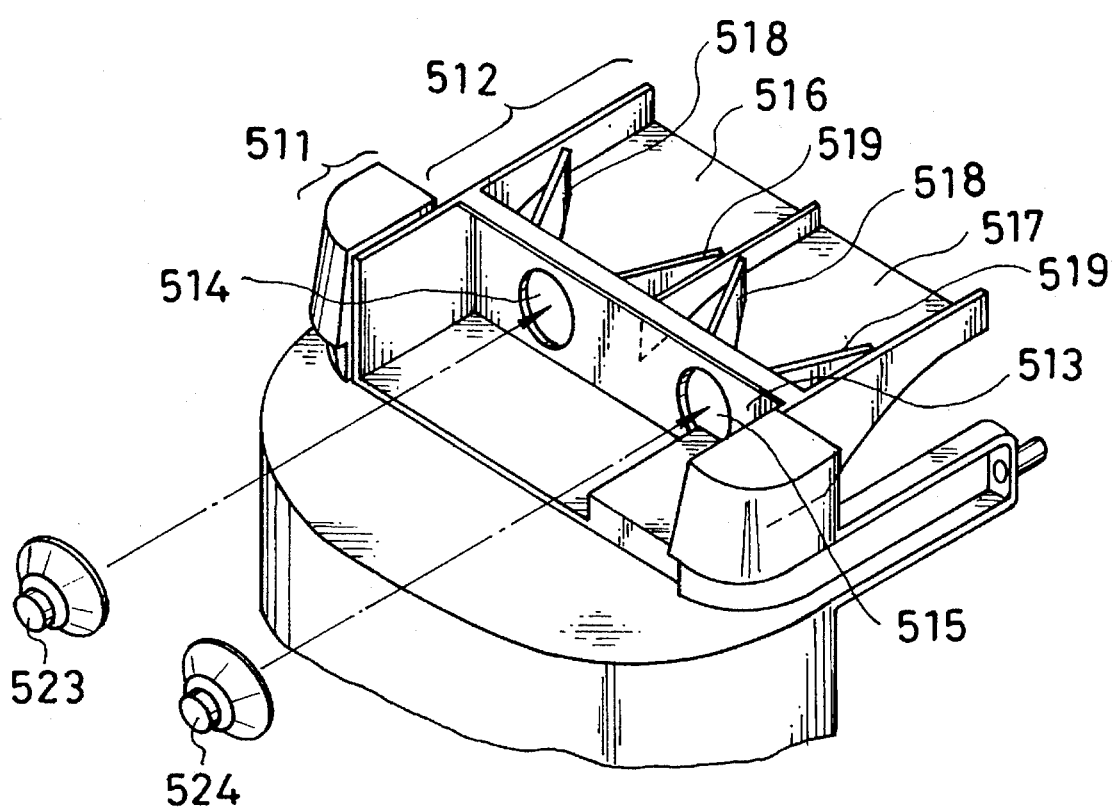
FIGS. 7–9, each is a perspective view of a speaker horn sub-assembly similar to that of the embodiment shown in FIGS. 6(a)–6(c).

In an embodiment shown in FIG. 7, wherein only essential part of the speaker horn sub-assembly is illustrated, a pair of speaker units 523 and 524 are fixed on the baffle board 513 of the embodiment illustrated with reference to FIG. 6 for realizing a stereophonic sound performance. A pair of inner horn members 518 and 519 are also provided in each of the branch horns 516 and 517.

EXAMPLE 8

Figure 8:
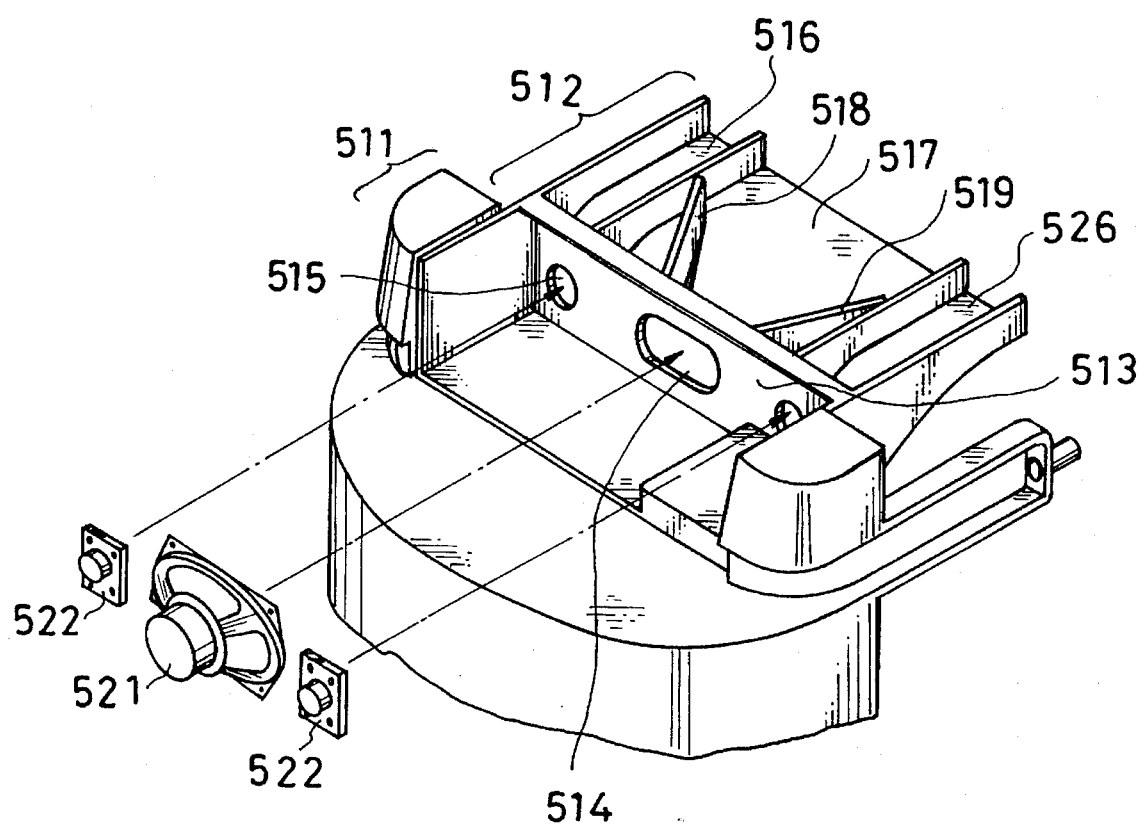

In an embodiment shown in FIG. 8, the front horn 512 is partitioned into three branch horns 516, 517 and 526, of which the center branch horn 517 has a pair of inner horn members 518 and 519. A woofer speaker 521 is provided at a position corresponding to the center branch horn 517 of the the baffle board 513 which is similar to that illustrated in FIG. 6(a). A pair of tweeter speakers 522 are provided on the baffle board 513 at positions corresponding to the side branch horns 516 and 526. Thereby a stereophonic sound performance in a two-way sound system is realized.

EXAMPLE 9

Figure 9:
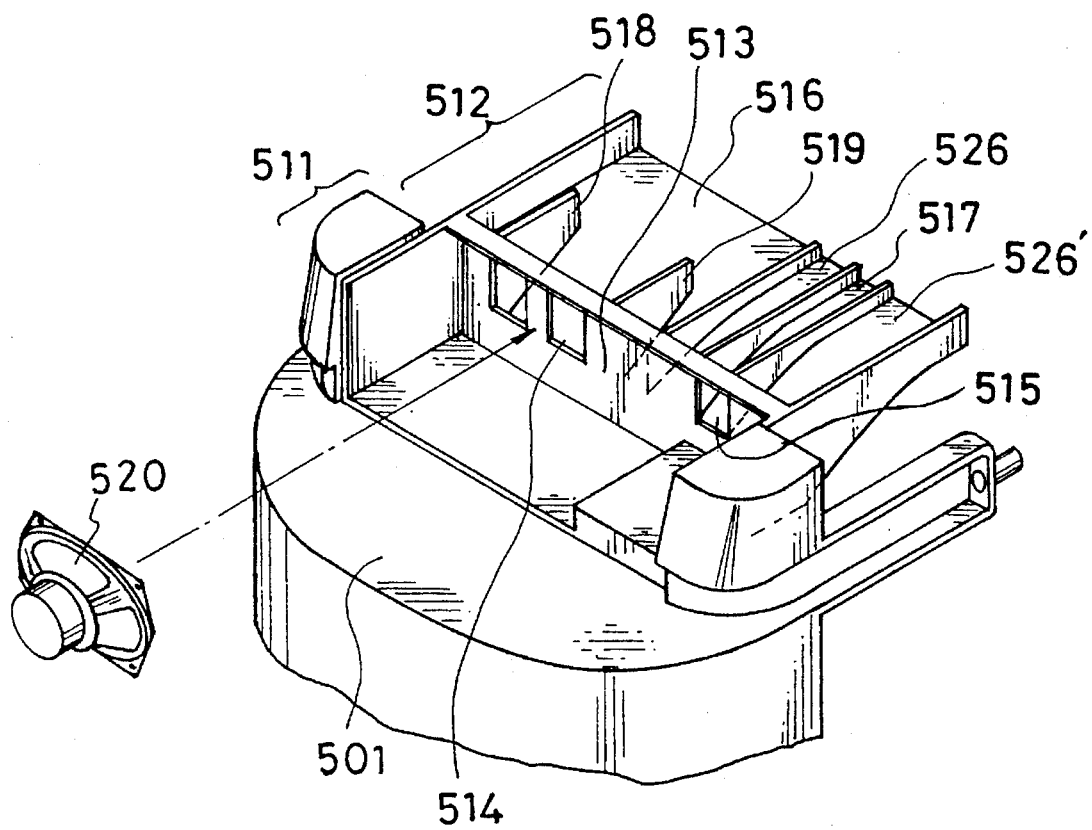
Figure 10:
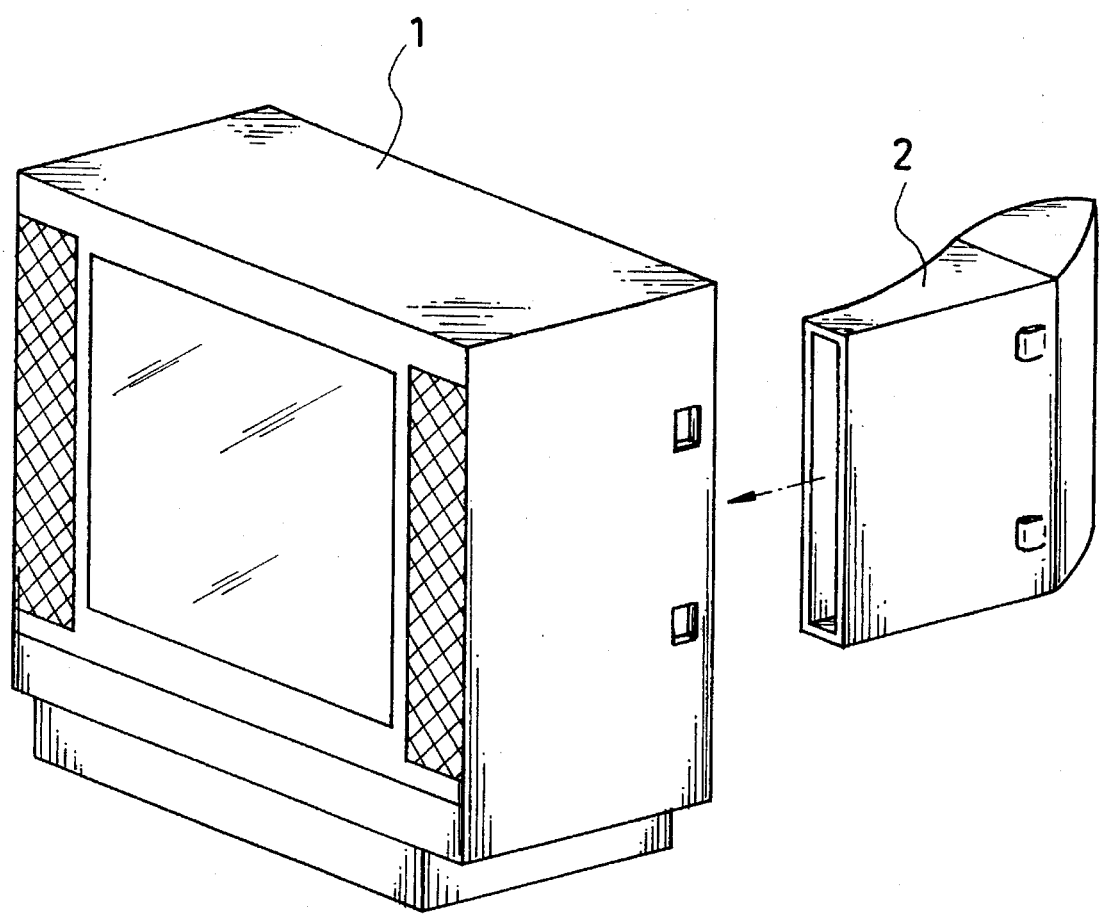
FIG. 10 is the schematic perspective view of the conventional television receiver and the loudspeaker sub-assembly showing a mode of installing the speaker horn sub-assembly in the receiver cabinet.

In an embodiment shown in FIG. 9, the front horn 512, which is projected from a baffle board 513 of the embodiment similar to that illustrated in FIG. 6(a), is partitioned into four branch horns 516, 517, 526 and 526', of which those 526 and 526' are used as vacant spaces for avoiding sound interference.

Although the present invention has been described in its preferred form with a certain degree of particularity, it is understood that the present disclosure of the preferred form has been changed in the details of construction and the combination and arrangement of parts and components may be resorted to without going out from the sprit and the scope of the invention as hereinafter claimed.

What is claimed is:

1. A television cabinet comprising:

a plurality of cabinet wall members constructed and arranged to define an interior space;

a pair of speaker horn sub-assemblies, each speaker horn sub-assembly having a U-shaped cross-section channel provided on a cabinet wall member, each said U-shaped cross-section channel including an open part and forming a horn-shaped cavity by combining said cabinet wall member with another cabinet wall member so that the open part is covered by said another cabinet wall member; and a speaker unit being mounted adjacent each said horn shaped cavity such that sound emanating from said speaker unit is directed through each said horn shaped cavity in a substantially linear direction towards a listener, wherein each of the speaker horn sub-assemblies further comprises:

a baffle board mounted to the cabinet for supporting said speaker unit, a front horn, projected forward from said baffle board, and having a narrowed cross-section region distal from said baffle board, a mid-point between said cabinet wall member and said another cabinet wall member which defines side members of each said front horn at said narrowed cross-section region being in a plane which includes a center line of a speaker unit; and each said front horn being formed in a manner that both side members thereof at regions between said baffle board and said narrow cross-section regions is substantially symmetrical with respect to a plane which contains each of the center lines of each said speaker unit and is perpendicular to a plane of each baffle board.

2. A television cabinet comprising:

a plurality of cabinet wall members constructed and arranged to define an interior space;

at least one speaker horn sub-assembly having a U-shaped cross-section channel provided on a cabinet wall member, said U-shaped cross-section channel including an open part and forming a horn-shaped cavity by combining said cabinet wall member with another cabinet wall member so that the open part is covered by said another cabinet wall member; and a speaker unit being mounted adjacent said horn shaped cavity such that the central axis of a cone of said speaker unit passes a mid-point between said cabinet wall member and a flexed another cabinet wall member at which the cross-section of the front horn begins to narrow, and sound emanating from said speaker unit is directed through said horn shaped cavity in a substantially linear direction towards a listener, said cabinet wall members comprising a front cabinet and a rear cabinet cooperable with each other such that said rear cabinet may be inserted into said front cabinet to define the interior space, said front cabinet including a pair of opposing inner wall members, said rear cabinet including a pair of opposing side wall members, an inner wall member cooperating with a side wall member so as to form said horn shaped cavity.

3. A television cabinet comprising:

a plurality of cabinet wall members defining front and rear cabinets and constructed and arranged to define an interior space;

at least one speaker horn sub-assembly disposed within said interior space, said speaker horn sub-assembly in conjunction with certain of said wall members defines a horn-shaped cavity; and a speaker unit disposed adjacent said horn shaped cavity such that sound emanating from said speaker unit is directed through said horn-shaped cavity, said rear cabinet including a pair of opposing side wall members, edge of which define a front face, at least one side wall member including a U-shaped cross-section channel and having a baffle board mounted in said channel with an opening for mounting said speaker unit thereon in a plane of the front face of said rear cabinet, said rear cabinet having an open rear end and a lid which covers said open rear end to form a rear horn of said speaker horn sub-assembly, said U-shaped cross-section channel elongates forward beyond the front face of said rear cabinet to form a front horn with certain wall members of said front cabinet when the rear cabinet is assembled with the front cabinet.

4. A television cabinet comprising:

a first cabinet portion; and a second cabinet portion, said first and second cabinet portions being constructed and arranged to be connected together to define an interior space, said first cabinet portion including a first part and said second cabinet portion including a second part, said first and second parts each having surfaces constructed and arranged to form a speaker horn in said interior space such that when said first and second cabinet portions are connected, said speaker horn is simultaneously formed by cooperation of said surfaces of said first and second parts.

5. A television cabinet comprising:

a plurality of cabinet wall members constructed and arranged to define an interior space;

a pair of speaker horn sub-assemblies, each speaker horn sub-assembly having a U-shaped cross-section channel provided on a cabinet wall member, each said U-shaped cross-section channel including an open part and forming a horn-shaped cavity by combining said cabinet wall member with another cabinet wall member so that the open part is covered by said another cabinet wall member; and a speaker unit being mounted adjacent each said horn shaped cavity such that sound emanating from said speaker unit is directed through each said horn shaped cavity in a substantially linear direction towards a listener, said cabinet wall members comprising a front and a rear cabinet cooperable with each other such that said rear cabinet may be inserted into said front cabinet to define the interior space, said front cabinet including a pair of opposing inner wall members, said rear cabinet including a pair of opposing side wall members edges of which define a front face, each side wall member including one said U-shaped cross-section channel and having a baffle board mounted within said channel with an opening for mounting one said speaker unit thereon in a plane of the front face of said rear cabinet, said rear cabinet having a pair of open rear end portions and a pair of lids which cover a respective open rear end portion to form a pair of rear horns of said pair of speaker horn sub-assemblies, and each of said U-shaped cross-section channels elongates forwardly beyond the front face of said rear cabinet to form a front horn with a part of an inner wall member of said front cabinet when the rear cabinet is inserted into the front cabinet.

6. A television cabinet comprising:

a rear cabinet comprising:

at least one baffle board having an opening permitting the passage of sound radiated from a speaker unit and being disposed on a side wall at an opening of said rear cabinet, a channel member of U-shaped cross-section and having an open-side being connected to said baffle board and protruded from said opening of said rear cabinet so that said open side faces towards outside of said rear cabinet, a front cabinet, separate from said rear cabinet, comprising four side wall members forming rectangular frame structure, said front cabinet being connected with said rear cabinet so as to cover said open side of said channel member with an inner surface of a side wall of said front cabinet to form a horn for directly guiding sound forwardly by associating said front cabinet to said opening of said rear cabinet, and a speaker unit mounted on said baffle board so that a central axis of a cone of said speaker unit passes through a center of the opening of said horn and sound emanating from said speaker unit is directed through said horn in a substantially linear direction toward a listener.

7. A television cabinet as claimed in claim 6, wherein said rear cabinet further includes a dent connected to said baffle board for isolating said speaker unit from an internal cavity of said rear cabinet and a lid for covering said dent.

8. A television cabinet as claimed in claim 6, wherein a cross section of said horn formed by said channel and the inner surface of said front cabinet is largest adjacent the baffle board and is gradually reduced towards an end of said channel.

* * * * *